Dec. 4, 1962 E. B. EICHELBERGER 3,067,335

HIGH ORDER DETECTOR CIRCUIT

Filed Dec. 30, 1959 2 Sheets-Sheet 1

INVENTORS
EDWARD B. EICHELBERGER

BY John P. Dority

ATTORNEY

Dec. 4, 1962 E. B. EICHELBERGER 3,067,335

HIGH ORDER DETECTOR CIRCUIT

Filed Dec. 30, 1959 2 Sheets-Sheet 2

United States Patent Office 3,067,335

Patented Dec. 4, 1962

3,067,335
HIGH ORDER DETECTOR CIRCUIT

Edward B. Eichelberger, Hightstown, N.J., assignor to International Business Machines Corporation, New York, N.Y., a corporation of New York Filed Dec. 30, 1959, Ser. No. 862,907
9 Claims. (Cl. 307—88)

This invention relates to circuits for performing logical functions and more particularly to circuits for detecting which device among a plurality of denominationally ordered devices is activated in a predetermined manner.

In data processing apparatus, it is often desirable that the particular position of a register, for example, containing a high order significant digit be detected in order to perform a control function. This control function may be, for example, control of the number of shifts required to place the high order significant digit of a multidigit number in the highest ordered position of a given register. Such functions have been performed in the past in a variety of ways, all of which have been somewhat cumbersome.

An object of this invention is to provide improved apparatus for detecting the high denominationally ordered signal among a group of signals.

Another object of this invention is to provide an improved high order significant digit detection circuit.

Another object of this invention is to provide improved apparatus for positively identifying the position of a register or the like containing a high order significant digit.

According to a preferred embodiment of the present invention, a plurality of denominationally ordered signal generating devices are provided for manifesting signals on outputs when a significant digit indication is present at an input. The output of each of these signal generating devices is appropriately amplified and fed to a winding on a correspondingly ordered magnetic core to produce a magnetomotive force tending to "set" the core. In addition, the amplified output signal is also fed to a winding on each lower ordered magnetic core to produce a magnetomotive force tending to "reset" all the lower ordered magnetic cores. Thus, only the high ordered core receiving a signal is set. All the cores are interrogated and only the set core produces an output signal, which output signal is indicative of the order containing the high order significant digit.

Another object of this invention is to provide an improved magnetic core high order significant digit detection circuit.

Another object is to provide an improved circuit capable of directly indicating the position of a register or the like containing a high order significant digit.

Still another object of this invention is to provide an improved circuit for generating a signal indicative of a particular denominational order having a predetermined characteristic.

The foregoing and other objects, features and advantages of the invention will be apparent from the following more particular description of a preferred embodiment of the invention, as illustrated in the accompanying drawings.

Figure 1:
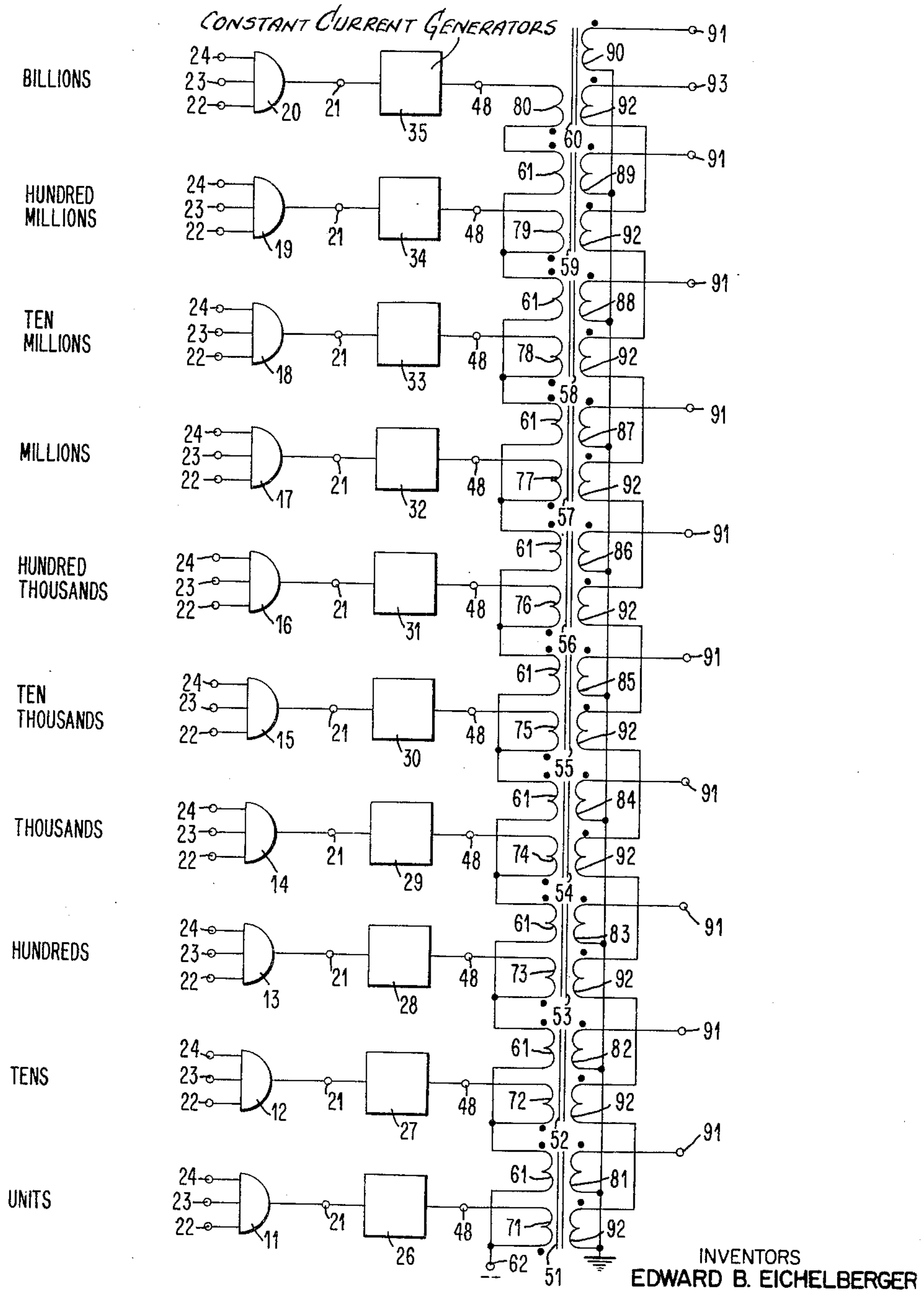
FIG. 1 is a diagrammatic representation of a high order significant digit detection circuit constructed in accordance with the present invention.

Referring to FIG. 1, there are shown a plurality of denominationally ordered significant digit responsive signal generators 11 through 20, each having an output 21 and each adapted to manifest a significant digit signal at its output. These signal generators are in the form of OR circuits and each is shown with three inputs 22, 23 and 24. The inputs 22, 23 and 24 may be connected as desired to a register or transmission lines manifesting data in a 2-out-of-5 code, for example. Let it be assumed that the 2-out-of-5 code of the register is in the form of a "0," "1," "2," "3" and "6" bit code with the "1" and "2" bits in combination representing a 0 or the only nonsignificant digit of the code. Thus, the "0," "3" and "6" bit positions of each order of the register are connected to the inputs 22, 23 and 24, respectively. Since the presence of a "0" bit, a "3" bit or a "6" bit demands a significant digit, the OR circuits at 11 through 20 may simply merge these three inputs to produce a signal if any one or more of the three inputs manifests a signal.

Figure 2:
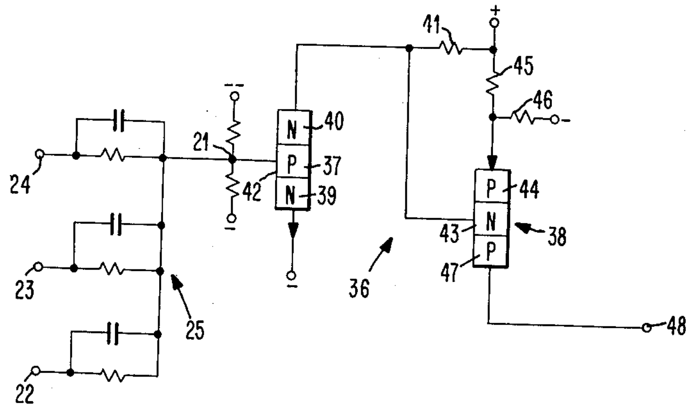
FIG. 2 is a schematic diagram of an OR circuit and a constant current amplifier employed in the circuit of FIG. 1.

A suitable form of OR circuit is shown at 25 in FIG. 2. This OR circuit is in the form of a resistor-capacitor network and operates such that a positive signal appearing on any one of the inputs 22, 23 and 24 will produce a positive-going output signal at the output 21. OR circuits of this variety and other varieties are well known and will not be described in any further detail.

The output of each signal generator or OR circuit 11 through 20, FIG. 1, is respectively connected to the input of a corresponding constant current generator 26 through 35. Each of the constant current generators 26 through 35 may be constructed as shown at 36 in FIG. 2.

The constant current generator 36 includes a transistor 37 and a transistor 38. Transistor 37 is of the NPN variety and has its emitter connected to a source of negative potential. The collector 40 of transistor 37 is connected through a resistor 41 to a source of positive potential. The input to the constant current generator is applied in the form of a positive-going signal from the output 21 to the base 42 of transistor 37. This positive-going signal applied to the base 42 causes transistor 37 to conduct, that is, turns transistor 37 "on." The collector of transistor 37 is thus driven to a negative potential, which negative potential is applied to the base 43 of the PNP-type transistor 38. The emitter 44 of transistor 38 is connected through a resistor 45 to a source of positive potential, and through a resistor 46 to a source of negative potential. The voltage divider network made up of resistors 45 and 46 thus, in the absence of an input to the transistor 38, maintains the emitter 44 at approximately 0 volt. The collector 47 of transistor 38 is connected to a load to be driven, which load, as will be seen hereafter, is terminated in a source of negative potential. The negative-going signal applied to the base 43 of transistor 38 will turn transistor 38 "on" to generate a constant current at the output 48.

A significant digit at an OR circuit 11 through 20, FIG. 1, will produce a significant digit signal output to a corresponding constant current generator 26 through 35 to turn the constant current generator "on" and drive a constant current through its output 48.

A plurality of magnetic cores 51 through 60 are respectively associated with the signal generators 11 through 20. These cores 51 through 60 and the corresponding signal generators 11 through 20 are arbitrarily denominated with the orders "units" through "billions" as indicated at the left of these elements in FIG. 1.

Each core 51 through 60 is equipped with winding means. Each core 51 through 59 has a winding 61 thereon. The windings 61 are connected in series relationship and are terminated at one end of the series in a source of negative potential at terminal 62. Each core 51 through 60 also has respectively a winding 71 through 80 thereon. The windings 71 through 80 are wound on the cores in such a direction that current from the constant current generators 26 through 35 produces magnetomotive force for driving the associated cores in such a direction that the driven cores tend to be "set." The windings 61 are wound on the cores in such a direction that current from the constant current generators 26 through 35 produce magnetomotive force for driving the associated cores in such a direction that the driven cores tend to be "reset." A core is referred to as "set" when it is magnetized in an arbitrarily chosen first direction. A core is referred to as "reset" when it is magnetized in a second direction opposite to the arbitrarily chosen first direction. The current produced by a constant current generator and the number of turns of the windings 71 through 80 on a core are sufficient to set the core if no opposing magnetomotive force is produced in the core by one of the windings 61.

Assume that all the cores 51 through 60 are initially reset. Assume also that significant digits appear in the hundreds and the ten millions orders of a register, not shown, associated with the signal generators 11 through 20. One of the inputs 22, 23 or 24 of signal generator 18 and one of the inputs 22, 23 or 24 of signal generator 13 will have a positive potential applied thereto. Thus, a significant digit signal will appear at the outputs of signal generators 13 and 18. These signals will turn constant current generators 28 and 33 "on" to supply a constant current through windings 73 and 78 to energize these windings. The current through winding 78 is sufficient to set core 58. This constant current from the output of constant current generator 33 is also driven through the series connected windings 61 on cores 51 through 57. Although the constant current through winding 73 on core 53 would alone be sufficient to set core 53, core 53 is not set because core 53 also has magnetomotive force produced therein in the opposite direction by current through the winding 61 thereon. Core 58 does not have magnetomotive force produced therein in a reset direction since none of the higher ordered signal generators produce a significant digit signal to turn their associated constant current generators on to drive a current through the winding 61 on core 58. Core 58 is the only core of the cores 51 through 60 that is set. It should be understood that signals from the register or transmission lines to the signal generators 11 through 20 all occur simultaneously and all the constant current generators that are turned "on" are turned "on" and "off" simultaneously. Thus, the magnetic state of only one of the cores 51 through 60 is reversed regardless of the number of significant digit signals present. The cores 51 through 60 are respectively provided with output windings 81 through 90 for detecting the high order core receiving a significant digit signal. A signal may be taken from the windings 81 through 90 at their associated output terminals 91. A signal is produced at the output terminal 91 from winding 88 as the state of magnetization of core 58 is reversed. This signal is indicative of the fact that the high order significant digit appears in the ten millions position of the register and thus is termed a high order signal. Each core 51 through 60 is provided with a reset winding 92. The reset windings 92 are connected in series. The series is terminated in a reference potential shown as ground at one end and in a terminal 93 at the other end. All the cores 51 through 60 are reset by driving current through the windings 92 from the terminal 93 to ground. As the core 58 is reset by a reset signal applied to terminal 93, a high order signal is again produced at the output terminal 91 of winding 88. This signal is opposite in polarity to the signal produced as core 58 was set. Either or both signals may be employed as desired to perform control functions in a machine of which this circuit is a part.

From the above description, it may be observed that only one core of the cores 51 through 60 can be driven by magnetomotive force in only the set direction. All the other cores are either driven by no magnetomotive force or are driven by magnetomotive force in the reset direction.

The circuit thus directly and positively generates a signal indicative of the denominational order associated with a high order significant digit.

While the invention has been particularly shown and described with reference to a prefered embodiment thereof, it will be understood by those skilled in the art that various changes in form and details may be made therein without departing from the spirit and scope of the invention.

What is claimed is:

1. A high order significant digit detection circuit comprising a plurality of denominationally ordered significant digit responsive signal generators each having an output adapted to manifest a significant digit signal, a correspondingly ordered magnetic core associated with each of said denominationally ordered signal generators, winding means on each of said cores, means responsive to a significant digit signal on the output of a denominationally ordered signal generator for energizing the winding means on the correspondingly ordered magnetic core to drive said correspondingly ordered magnetic core with a magnetomotive force in one direction and for energizing the winding means on all lower ordered magnetic cores to drive said lower ordered magnetic cores with a magnetomotive force in the opposite direction, and means associated with each core for generating a high order signal in response to a magnetomotive force in the core in only said one direction.

2. Apparatus according to claim 1 wherein said cores are constructed of material having substantial retentivity.

3. Apparatus according to claim 1 wherein said high order signal generating means comprise a winding on each of said cores.

4. Apparatus according to claim 1 wherein said energizing means comprise a plurality of constant current generators.

5. Apparatus according to claim 4 wherein said winding means comprise a first winding on each of said cores connected in series relation and a second winding on each of said cores connected respectively to corresponding ones of said constant current generators.

6. Apparatus according to claim 5 wherein said high order signal generating means comprise a third winding on each of said cores.

7. Apparatus according to claim 6 wherein said winding means further comprises a reset winding on each of said cores.

8. Apparatus according to claim 7 wherein said reset windings are connected in series relationship.

9. A high order signal detection circuit comprising a plurality of denominationally ordered signal generators each having an output adapted to manifest a signal, a correspondingly ordered magnetic core associated with each of said denominationally ordered signal generators, winding means on each of said cores, means responsive to a signal on the output of a denominationally ordered signal generator for energizing the winding means on the correspondingly ordered magnetic core to drive said correspondingly ordered magnetic core with a magnetomotive force in one direction and for energizing the winding means on all lower ordered magnetic cores to drive said lower ordered magnetic cores with a magnetomotive force in the opposite direction, and means associated with each core for generating a high order signal in response to a magnetomotive force in only said one direction.

References Cited in the file of this patent

UNITED STATES PATENTS

| | | |
|---|---|---|
| 2,817,079 | Young | Dec. 17, 1957 |
| 2,846,667 | Goodell | Aug. 5, 1958 |
| 2,909,673 | Gunderson | Oct. 20, 1959 |
| 2,920,825 | Lanning | Jan. 12, 1960 |